April 1, 1952 — R. E. McLEAN — 2,591,181
ROTARY TYPE CAN OPENER
Filed June 6, 1946 — 6 Sheets-Sheet 1

INVENTOR
Robert E. McLean
BY Wilfred E. Lawson
ATTORNEY

April 1, 1952 R. E. McLEAN 2,591,181
ROTARY TYPE CAN OPENER
Filed June 6, 1946 6 Sheets-Sheet 3

INVENTOR
Robert E. McLean
BY *Wilfred E. Lawson*
ATTORNEY

Patented Apr. 1, 1952

2,591,181

UNITED STATES PATENT OFFICE 2,591,181

ROTARY TYPE CAN OPENER

Robert E. McLean, Fort Benning, Ga., assignor to John C. Hockery, Kansas City, Mo., as trustee Application June 6, 1946, Serial No. 674,854

16 Claims. (Cl. 30—8)

1

This invention relates generally to the class of cutlery and pertains particularly to improvements in rotary drive or feed wheel type can openers.

An object of the present invention is to provide a can opening device having a single rotary operating handle and a can rim engaging driving or feed wheel and head penetrating knife movable relative to one another, wherein a novel and improved means is provided for effecting, upon a predetermined degree of rotation of the operating handle, the desired relative movement between the can rim engaging driving wheel and the can head penetrating knife.

Still another object of the invention is to provide a can opening device of the character above described, wherein, after effecting the penetration of the can head by the knife, the operating handle may be freely rotated to effect rotation through the driving wheel of the can relative to the knife.

Still another object of the invention is to provide a can opening device of the character above described, wherein novel means is provided whereby upon partial reverse rotation of the operating handle, said driving wheel and knife will be immediately separated to facilitate the removal of the can from the device.

A still further object of the invention is to provide a can opening device of the character stated wherein the construction and cooperative relation of the several parts is such that the action of bringing about the penetration of the can head by the knife, the rotation of the can relative to the knife to effect removal of can head, and the reverse operation to separate the can driving wheel from the knife for the release of the can, may all be accomplished smoothly, noiselessly, and with a minimum of effort.

A still further object of the invention is to provide a device of the character described wherein the several above enumerated steps may be accomplished with a minimum of frictional resistance between movable connected parts and wherein the construction and manner of coupling the several parts together in each of the embodiments of the invention, is such that exceptionally good alignment can be maintained between the parts whereby the device will continue to operate easily and effectively after prolonged use.

Other objects and advantages of the invention will become apparent as the description of same proceeds, and the invention in its several embodiments will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

Referring now more particularly to the drawings reference will first be made to the first embodiment of the invention which is illustrated in Figures 1 to 6 inclusive.

The form of the first embodiment is designed to be held in the hand while being applied to a can and while the head of the can is being cut out.

In this embodiment the numeral 10 generally designates the body plate, the major portion of which is substantially square as shown with a top edge extension 10' of reduced width.

In the description of the present embodiment and the succeeding embodiments the side of the body plate which is to the right or which is remote from the can when the device is in use will be referred to as the right hand or outer side while the opposite or left hand side will be referred to as the inner side. The vertical edge of the body plate which is nearest the operator is the forward or front edge while the opposite vertical edge is the rear edge.

As shown in Figures 1 to 6, the body plate 10 of the first embodiment has formed at the rear edge of the lower part thereof the abutment flange 11 which extends substantially perpendicular to and from the outer side of the plate. Also upon the outer side of the body plate in the extension portion 10' there is formed at the forward edge the right angularly extending stop flange 12.

Swingingly supported upon the outer side of the extension portion 10' of the body plate by the pivot pin or rivet 13, is the pawl 14 which has the upper corner of the forward edge angled or cut away obliquely as indicated at 15 to permit the tip of the pawl to swing rearwardly to a limited extent controlled by the flange 12. This flange 12 also functions to prevent the pawl from swinging forwardly beyond a hanging or stop position.

Figures 1, 2, 3:
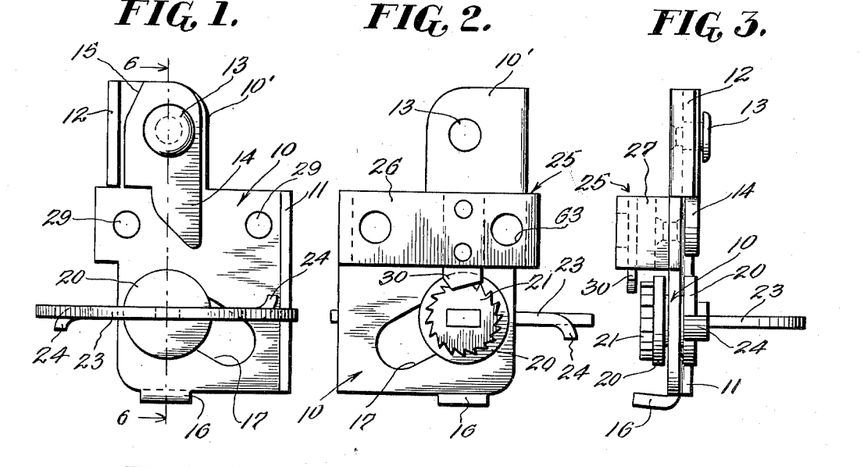
Figure 1 is a view in elevation of the right hand or outer side of one embodiment of the present invention.
Figure 2 is a view in elevation of the inner or left hand side of the same.
Figure 3 is a view in front elevation of the same.
Figure 6:
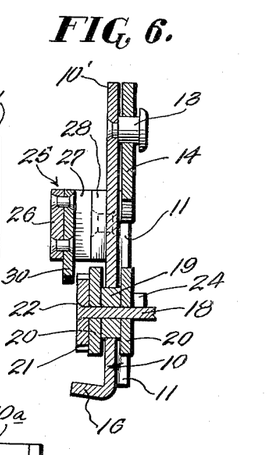
Figure 6 is a sectional view taken substantially on the line 6—6 of Figure 1.

The bottom edge of the body plate 10, directly in line with the rivet 13, has formed integral therewith the angularly directed can rest or foot 16 which extends to the left or beyond the inner side of the body plate as shown in Figures 3 and 6.

Figures 4, 5:
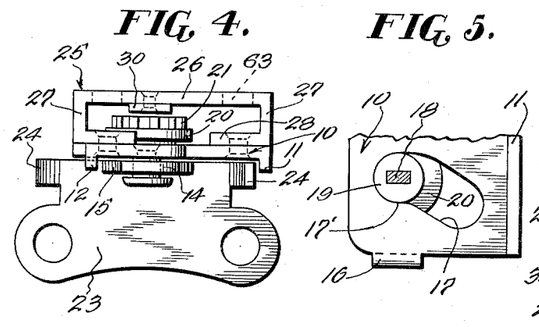
Figure 4 is a view in top plan of the same.
Figure 5 is a detailed section taken through the lower parts of the device in a plane parallel with and lying at the outer side of the body plate and showing the mounting of the operating shaft journal in the body plate.

Formed through the body plate 10 is a camming slot 17 which, as shown in Figures 1, 2 and 5, extends downwardly and rearwardly and, as particularly shown in Figure 5, the upper forward end of this slot is directed in a line transversely of the body plate or extending substantially horizontally from front to rear thereby forming a seat 17'.

This seat lies directly in the line between the can rest 16 and the pivot center for the pawl 14.

The numeral 18 designates the crank shaft which extends through and is fixed against relative rotation with, the journal 19, which fits in the slot 17 and which has a diameter substantially equal to the width of the slot. Upon opposite sides of the journal 19, the shaft 18 has mounted thereon the washers 20 and upon the inner side of the washer 20 which is at the inner side of the body plate 10 there is fixed to the shaft 18 the peripherally toothed can rim engaging driving wheel 21. Any suitable means may be employed for securing this driving wheel to the shaft but the means here illustrated comprises the swaging or spreading of the end of the shaft 18 as indicated at 22, to lock the parts together.

At the opposite or outer side of the body plate 10 and of the other washer 20 the shaft 18 is formed integrally with a thumb and finger crank 23 which in the edge nearest to the outer side of the body plate 10 is suitably recessed or formed to receive the adjacent washer 20. The radially directed edges of the crank 23 are provided with the oppositely curved thrust fingers 24, the rounded or convex outer sides of which are adapted to successively contact the forward face of the abutment flange 11 in certain stages of the operation of the device.

Positioned upon the left hand or inner side of the body plate across the top portion thereof, is the rectangular cutter supporting frame which is generally designated 25 and which comprises preferably a single piece of material formed to provide the bar portion 26, the short front and rear end portions 27 and the inturned foot portions 28 which are in spaced end opposed relation and are in spaced parallel relation with the side bar 26. These foot portions 28 are secured by rivets 29 to the body plate so that the bar portion 26 is held in spaced parallel relation with the body.

Secured to the bar portion 26 of the frame on the side thereof nearest the body plate is the can head top penetrating knife 30 which projects below the lower edge of the bar portion 26 as shown in Figures 2, 3 and 6. This knife is maintained in a vertical plane paralleling the inner side of the body plate but spaced from such inner side beyond the plane of the inner side of the driving wheel 21 as shown in Figures 3, 4 and 6. The point of the cutter 30 extends down to a level where it is below the highest part of the periphery of the driving wheel 21 when the journal is at the high, forward end of the cam slot 17. When the driving wheel is moved to this position after the device has been installed upon the rim of a can the point of the knife will be caused to penetrate the head of a can.

Figures 7, 8:
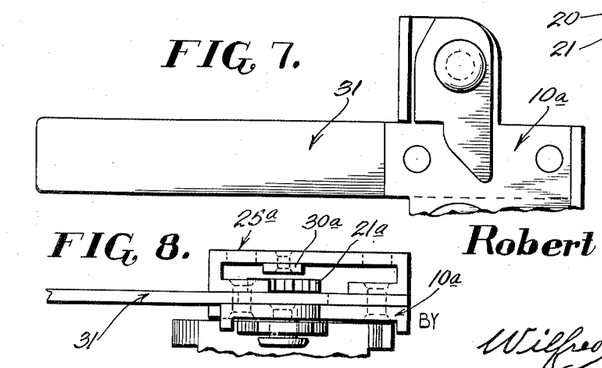
Figure 7 is a view in elevation of the upper part of the embodiment shown in Figure 1 looking at the outer side and showing the application of a handle thereto.
Figure 8 is a view in top plan of the modification shown in Figure 7.

As previously stated the embodiment shown in Figures 1 to 6 is designed to be held in the hand for use and a slight modification of this embodiment is shown in Figures 7 and 8 where there is provided a handle which is generally designated 31, which is secured to the inner side of the body plate 10a between the same and the cutter carrying frame which is here generally designed 25a. As will be readily seen upon reference to Figure 8, in order that the cutting knife, here designated 30a may be maintained at the proper position with respect to the can rim engaging driving wheel 21a, the width of the knife supporting frame is materially reduced but the function of this frame, as hereinafter described, is unchanged by such a change in form.

Figure 9:
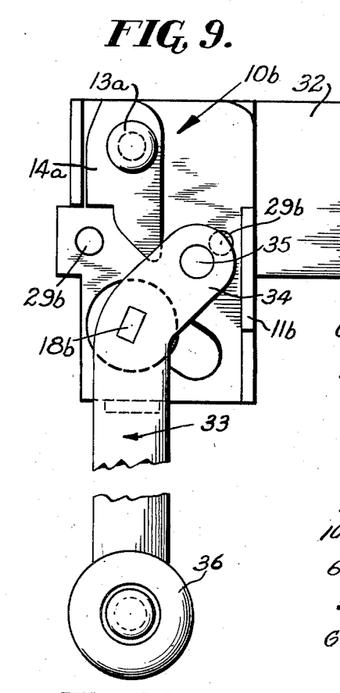
Figure 9 is a view in elevation of the outer side of a further modification of the embodiment shown in Figure 1 in which the body plate is mounted from a supporting bracket and a different type of operating crank is employed.

Figure 9 illustrates another modification of the first embodiment wherein the body plate 10b is mounted upon a bracket arm 32 which is designed for attachment to a wall or other suitable supporting surface. An extension arm of this character may be of the form illustrated in any one of my United States Patents No. 2,351,531 of June 13, 1944; No. 2,411,448 of November 19, 1946; No. 2,427,613 of September 16, 1947; and No. 2,437,647 of March 9, 1948. It is understood that any one of the several embodiments of the invention here illustrated and described may be used in conjunction with any of the brackets or bracket supports shown in the patent or applications referred to.

Construction of the modification shown in Figure 9 is essentially the same as the design or construction of the embodiment shown in Figures 1 to 6 inclusive with the exception that the full width of the plate is carried to the top of the portion to which the pawl 14a is pivotally attached by the pivot rivet 13a, whereby a better means is obtained for producing a rigid connection between the body plate and the bracket 32.

While the knife or cutter supporting frame is not shown in connection with the modification illustrated in Figure 9 it will be understood that the bracket arm 32 is mounted or secured between the cutter supporting frame and the body plate in the same manner as the handle 31 is secured, as shown particularly in Figure 8, the bracket arm 32, body plate 10b and cutter frame being all firmly secured together by the rivets 29b.

In the modification shown in Figure 9 a hand crank 33 is employed in substitution for the thumb and finger crank 23, which hand crank is mounted upon the driving wheel carrying shaft, here designated 18b.

In place of the thrust fingers 24 which are used in association with the thumb and finger crank, the hand crank or crank arm 33 is provided at its upper end with the oblique extension 34 in which is fixed an end of a thrust stud 35 which extends toward the adjacent or outer side of the body plate and which is designed, like the finger 24, to engage the rearwardly disposed abutment flange 11b.

The outer end of the hand crank 33 carries the knob 36 which is grasped in the hand to facilitate turning the crank and rotation of the shaft 18b.

In the operation of the embodiment shown in Figures 1 to 6, the description of which will apply also to the modification shown in Figures 7 to 9 inclusive, it will be readily apparent, if the journal 19 is in the upper end of the cam slot 17 it is first shifted rearwardly to the lower end of the cam slot thus moving the can driving wheel 21 back and down away from the cutter 30. The point of the cutter 30 is then engaged against the inner side of the can rim and upon the top of the can top, positioning the inner side of the can rim engaging driving wheel 21 against or in opposed relation with the side of the can and the device is then oscillated to move the end of the can rest 16 inwardly toward the side of the can so as to bring the teeth of the wheel 21 to position beneath the can rim. By then imparting clockwise rotation to the crank, the thrust element, that is, one of the fingers 24 or the pin 35, is brought into contact with the forward face of the flange 11 or 11b whereupon the shaft will be forced to move upwardly and forwardly in the cam slot 17 thereby pulling down upon the entire device and forcing the point of the cutter to penetrate the head of the can. Continued clockwise rotation of the crank after the journal 19 has seated on the seat 17' in the upper end of the cam slot, will effect the movement of the cutter around the rim of the can to cut out the can head.

During such clockwise rotation the thrust elements will engage and swing under the pawl 14 but after the can head has been cut out, reverse or counterclockwise rotation of the crank will swing one of the thrust elements into contact with the rear edge of the pawl and thus force the shaft and journal rearwardly and downwardly in the cam slot to separate or move the can rim engaging driving wheel 21 away from the cutter 30 thus restoring the parts to starting position and making possible the easy removal of the device from the can.

The mounting provided for the cutter 30 as shown and described and as hereinafter described in the succeeding embodiments of the invention, is designed to have a certain amount of flexibility whereby relative lateral movement between the knife and driving wheel is permitted when necessary as, for example, during the passage of the can seam between the knife and the opposing face of the driving wheel.

In the first embodiment the frame, designated 25 is provided in its outer portion with the aperture 63. This aperture facilitates the application and securing in position of the adjacent rivet 29.

Figures 10 to 14 illustrate a second embodiment of the invention which is constructed to be mounted upon a wall attached supporting bracket, such bracket being designated 65.

The body plate is generally designated 66 and it is secured to the bracket arm 65 by the rivets 67 and 68, the latter rivets also functioning as hereinafter described to secure another member to the structure and more particularly to the inner side of the bracket arm 65.

Upon the right hand or outer side of the body plate 66 there is positioned an oscillatable bell crank member which is generally designated 69. This bell crank member comprises the upper portion 70 which assumes a substantially horizontal position or a position transversely of the top of the body plate, when the device is being operated for the removal of the top from a can. The bell crank further includes the downwardly extending rear end portion or leg 71 which has a vertical forward edge which is bordered by the abutment flange 72.

Figure 10:
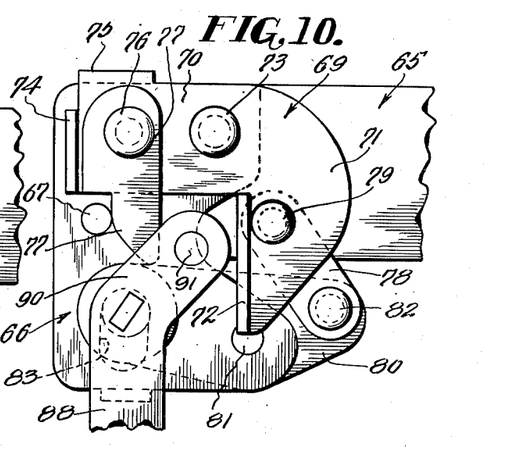
Figure 10 is a view in elevation of the outer side of a second embodiment having a wall mounting bracket and a hand crank operating means, the upper portion only of which crank is shown.
Figure 11:
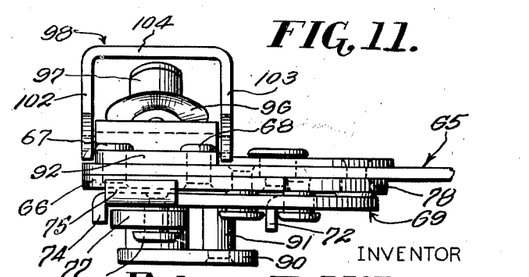
Figure 11 is a view in top plan of the structure shown in Figure 10.

The part 70 of the bell crank might be described as an arm and as shown in Figure 10 this arm has passing therethrough and is pivotally mounted upon a pivot rivet 73 which is secured to the body 66 adjacent to the rear edge thereof.

Figure 14:
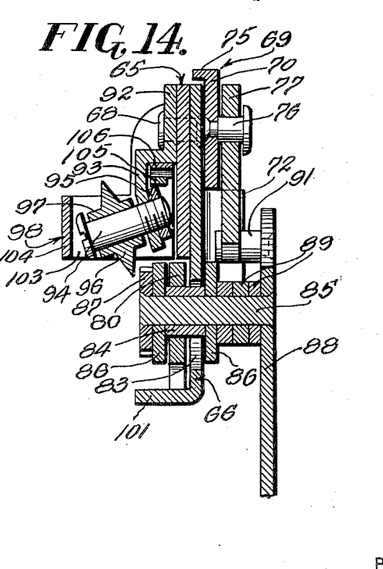
Figure 14 is a vertical section taken substantially on the line 14—14 of Figure 13.

The forward vertical edge of the arm 70 carries the laterally extending stop flange 74 and the top edge of the arm, adjacent to the forward end carries the downward movement limiting flange 75 which extends across the top edge of the body plate as shown in Figure 14 and limits the downward swinging of the arm 70 to a horizontal position as shown in Figure 10.

The arm 70 of the bell crank 69 carries adjacent to its forward end, the pawl supporting rivet 76 upon which is swingingly mounted the pawl 77. The forward swinging of this pawl is limited by the stop flange 74, adjacent to the rear face of which the forward edge of the pawl is closely positioned when the pawl is hanging freely in the manner shown.

The bell crank 69 forms one half of a toggle link, the other half of which comprises the link member 78 which is positioned rearwardly of and in the same plane as the body plate 66. One end of this link member 78 is pivotally secured to the depending leg 71 of the bell crank by the rivet 79 and is positioned between the leg 71 and the bracket arm 65.

Upon the inner side of the body plate 66 there is positioned directly below the bracket arm 65 the flat rock lever bar 80 which is pivotally joined intermediate its ends to the body 66 by the pivot 81.

An end of the rock lever bar 80 extends beyond the rear edge of the body plate and the other end of the link member 78 is pivotally coupled therewith by means of the rivet 82.

The body plate 66 is provided directly below the pawl pivot 76 with the slightly arcuate vertically arranged slot 83 the arc of which slot is struck from the center of the pivot 81. The rock lever bar 80 extends forwardly beyond this slot 83 and it carries a journal 84 which fits snugly in the slot 83 and is adapted to have up and down movement therein in the operation of the opener.

The journal is formed to receive the crank shaft 85 which, like the shafts in the other embodiments, is of polygonal cross section so that it will not turn in the journal and mounted upon this shaft at opposite ends of the journal so as to have the body plate 66 and the bar 80 between them, is a pair of washers 86.

Upon the inner side of the body plate and of that washer 86 which is next to the bar 80, is secured the can rim engaging and driving wheel 87 while the opposite end of the shaft 85 passes through and is secured in the upper end portion of the hand crank lever 88. Between the hand crank lever 88 and the adjacent washer 86, spacer washers 89 are located to maintain the parts in proper assembled relation.

The crank lever 88 is of the same form as that shown in the modified structure of Figure 9 in that it has a knob at its lower end, not shown, while at its upper end it has the obliquely rearwardly directed terminal portion 90 which carries a thrust element in the form of a pin 91 which is designed to contact the abutment flange 72 during certain periods in the operation of the device.

The numeral 92 designates the cutter wheel supporting bracket which is secured to the inner side of the bracket arm 65 by the rivets 68. This supporting bracket has a lower end portion 93 which is spaced from the inner side of the bracket arm 65 and is directed downwardly and to the right toward the bracket 65 as shown in Figure 14. This lower end portion of the cutter supporting bracket is suitably apertured and threaded to receive the cutter wheel supporting bolt 94 which is secured at its inner end by the lock nut 95. As shown in Figure 14 this lock nut 95 is located between the bracket portion 93 and the bracket arm 65.

The numeral 96 designates the cutter wheel which is shown as having a relatively long hub portion 97 through which the supporting bolt 94 passes. This long hub assures strength, ease of operation and continued good alignment after prolonged use as well as maximum durability.

The numeral 98 generally designates the resilient can rest against the under or bottom edges of which the flange of a can bears when the can is mounted in the opener device. This position of the can upon the device is shown in broken lines in Figure 12 where the side wall of the can is designated 99 and the top or head of the can is designated 100. As shown in this figure the side wall of the can rests or bears against the can rest 101 which forms a lateral extension of the lower edge of the body plate.

As shown the resilient can rest 98 is in the form of an open frame having the vertical forward and rear portions or sides 102 and 103 respectively and the connecting inner side 104 which when the rest is in position upon the inner side of the bracket arm 65, is in spaced parallel relation with the inner side of such bracket arm. In its mounted position the resilient can rest 98 straddles the cutter wheel bracket 92 and the cutter wheel, the free vertical edges of the front and rear sides of the resilient rest being positioned against the inner side of the bracket arm 65.

The resilient can rest 98 is maintained in proper position by the bar 105 which extends across between and has its ends secured in the front and rear sides 102 and 103 of the can rest and extends across the upper side of the cutter wheel bolt securing nut 95 between the off-set portion 93 of the cutter wheel bracket and the bracket arm 65. This arrangement is clearly shown in Figure 14.

Interposed between the bar 105 and the overlying portion of the cutter wheel supporting bracket is an arched spring 106 which exerts a downward thrust against the bar, maintaining it firmly in position upon the nut 95. Due to the fact that the cutter wheel supporting bracket 92 is of a width substantially equalling the distance between the inner faces of the front and rear sides of the resilient can support it will be readily seen that the can support will only be permitted vertical movement and this vertical movement is opposed by the arched spring which is housed between the fixed cutter wheel supporting bracket plate and the nut supported upon the inner end of the cutter wheel securing bolt. Since the bar 105 is closely adjacent to the right hand side of the off-set portion 93 of the cutter wheel supporting bracket it will be seen that the resilient rest can not move outwardly away from the bracket arm 65.

The spring 106 is engaged at the arched central portion against the bracket 92 and at its ends it bears upon the bar 105 and is of proper tension to provide the can rest 98 with the desired resiliency to maintain the can in good alignment when the end is being cut therefrom and also to insure adequate traction of the can driving wheel 87 with the under edge of the rim or flange of the can.

If desired, the lower edge of the can rest 98 may be flanged to provide a larger bearing and wear surface. The portions of the can rest 98 which surround the cutter wheel, in addition to providing a rest for the can, also serve as a guard for protecting the cutter wheel against accidental damage and also for protecting the operator against accidental injury.

Figures 22, 23, 24, 25, 26:
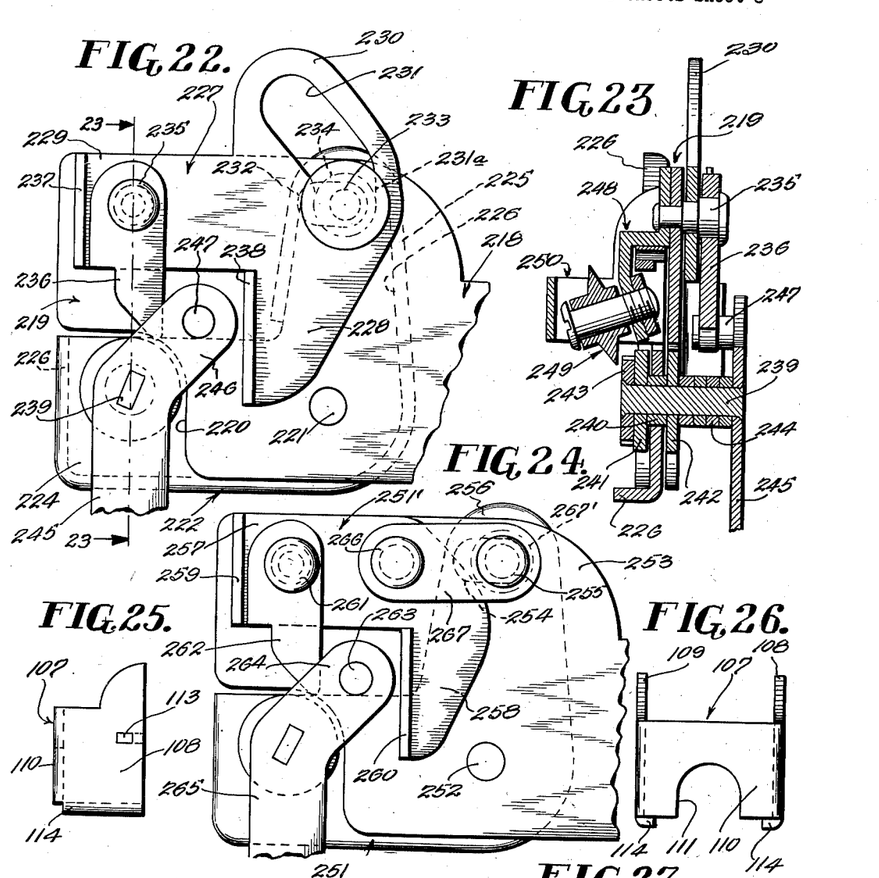
Figure 22 is a view in elevation of the outer side of a sixth embodiment having a wall bracket mounting and hand crank operating means.
Figure 23 is a vertical section taken substantially on the line 23—23 of Figure 22.
Figure 24 is a view in elevation of the outer side of the seventh embodiment of the invention having a wall bracket mounting and hand crank operating means.
Figures 25, 26 and 27 are views respectively of the front side, the inner side and top of a modified form of the can rest.
Figure 27:
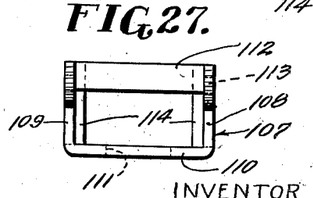

In Figures 25, 26 and 27 there is illustrated a modification of the can rest 98. This modified rest is generally designated 107 and, as shown, it comprises the front and rear sides 108 and 109 respectively and the inner side 110. This can rest is designed for use in the same position as the rest 98 and when in such position the free vertical edges of the front and rear sides 108 and 109 will bear, like the rest 98, against the left hand side of the bracket 65.

As shown the rest 107 is of less width than the can rest 98 and the inner side 110 is provided with the lower edge recess 111 which straddles the outer end portion of the hub 97 of the cutter.

The front and rear sides of the modified can rest are connected by the bar 112 which corresponds to the bar 105 except that this bar is of materially greater width in the portion thereof which lies between the sides 108 and 109 of the can rest so that portions of the ends of the bar 112 bear against the inner faces of such sides as shown in Figure 27. Portions of the bar 112 are of reduced width as shown in Figure 25 and indicated at 113 for extension through openings in the adjacent portions of the rest and these reduced ends are suitably swaged to firmly secure the bar in position. As shown most clearly in Figure 26 the lower ends of the side members or portions 108 and 109 extend below the lower edge of the inner side portion 110 and have their ends inturned, as indicated at 114, to form flanges to provide a larger wearing surface.

Figure 13:
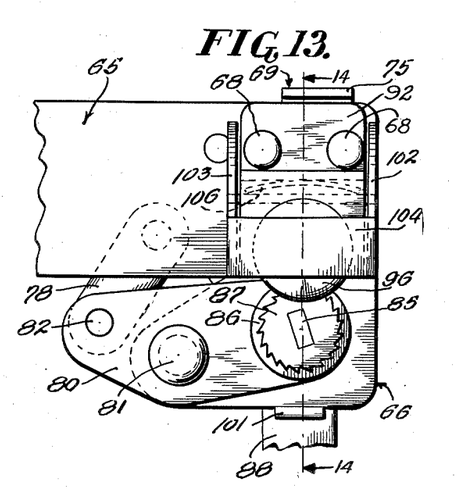
Figure 13 is a view in elevation of the inner side of the second embodiment.

Since this modified can rest functions in the same manner as the can rest 98 it will be readily seen that when it is substituted for the rest 98 the arched spring 106 may be used in the same manner as it is shown in Figures 13 and 14. When this modified can rest is used the lower end of the cutter wheel support bracket 92 would have its corners suitably rounded or notched as necessary to provide operating clearance for the inturned lower ends 114 of the side members 108 and 109.

In the operation of the second embodiment oscillation of the rock lever bar 80 downwardly at its forward end will effect the rocking movement of the bell crank 69 upon its pivot 73 to raise or lift the forward end of the arm 70, the driving wheel supporting shaft 85 being lowered at the same time. This oscillation of the bell crank swings the hanging arm 71 forwardly into a position where, upon clockwise turning of the crank handle 88, the pin 91 will strike the abutment flange 72.

When the can has been placed in position with the flange resting upon the edge of the driving wheel the stated clockwise turning of the crank 88 will bring the pin 91 around against the forward face of the flange 72 and a rearward thrust will be imposed against the depending arm of the bell crank thus imposing a down thrust upon the rear end of the rock bar 80 through the medium of the link 78. This will swing the forward end of the rock bar upwardly, raising the can rim engaging wheel and the shaft and causing the cutter to be forced through the head of the can. The top edge of the can rim will rest against the under edges of the forward and rearward sides of the rest 98 and the side of the can will be in position against the lateral can rest 101. Continued clockwise rotation of the crank will then cause the can to be turned with respect to the cutter and the head will be cut out.

Upon counterclockwise turning of the crank 88 the pin 91 will engage the depending pawl 77 and since the forward swinging of the pawl will be prevented or at least limited by the stop flange 74, an upward thrust will be imposed upon the forward end of the arm 70 of the bell crank thereby relatively swinging the crank and the link 78 to oscillate the bar 80 in a direction for the lowering of the driving wheel 87. As will be readily apparent upon consideration of Figure 10, when the bell crank and link are in the position to which they are moved by the pin 91 engaging the abutment flange 72, the centers of the pivots 73, 79 and 82 will be brought substantially into alignment and thus the links and the rock lever bar will be locked in this position while the operation of cutting out the head of the can is being carried out.

Figures 15, 16, 17:
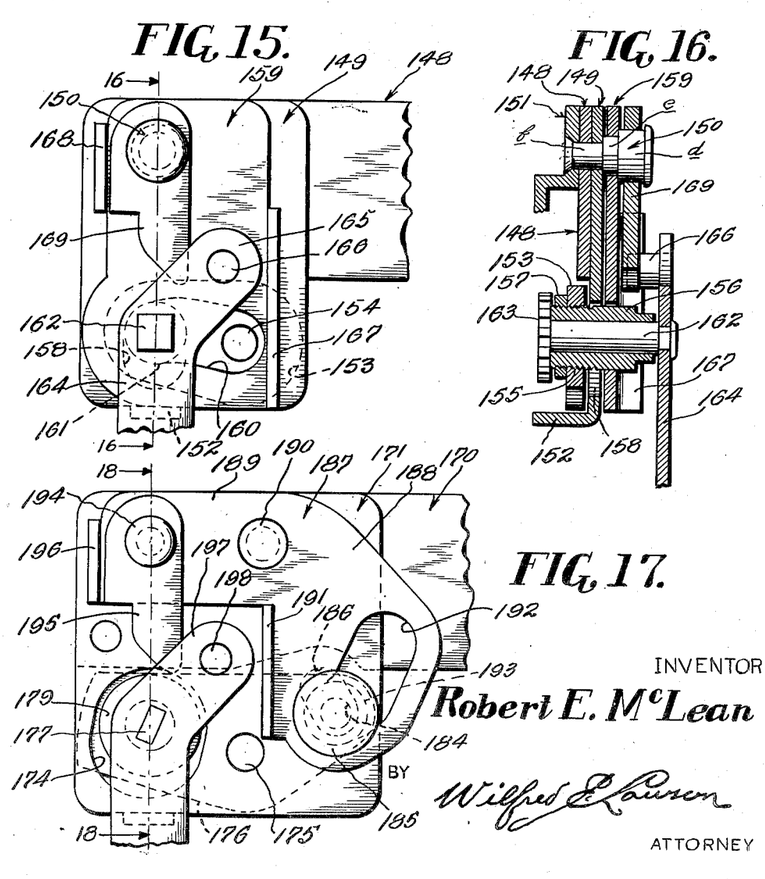
Figure 15 is a view in elevation of the outer side of the third embodiment of the invention.
Figure 16 is a vertical section taken substantially on the line 16—16 of Figure 15.
Figure 17 is a view in elevation of the outer side of a fourth embodiment of the invention.

Figures 15 and 16 illustrate a third embodiment of the invention wherein a supporting bracket arm is designated 148 and has secured thereto the body plate 149.

Secured to the upper part of the body plate and extending through the bracket 148 is the fixed rivet 150 which is formed by the three graduated diameters $d$, $e$, and $f$, the smaller portion $f$ having the bracket and body plate secured thereto and also passing through and securing in position the cutter bracket 151 upon which a cutter element may be suspended. The lower portion of this bracket is, however, broken away. It is not believed necessary to illustrate the cutter member which would be of the same character as that illustrated in the embodiment shown in Figures 12 and 14.

The lower end of the body plate carries the laterally extending can rest 152 and disposed adjacent to the inner side of the body above the can rest is a driving wheel support link 153. This link has a length extending transversely of the lower part of the body plate and is pivotally attached to the body plate by the pivot rivet 154 which passes through one end of the link and which is disposed adjacent to the rear edge of the body plate.

The forward end of the link 153 has a threaded opening 155 in which is threadably engaged an end of the bearing sleeve 156 which is secured in position by the lock nut 157.

The bearing sleeve extends through the vertically extending elliptical and slightly arcuate slot 158 which is formed in the body plate 149.

Supported upon the intermediate portion $e$ of the stud 150, for rocking movement, is the cam plate 159 which at its lower end has formed therein the cam slot 160 through which the right hand end of the bearing sleeve 156 extends. This slot 160 is for the major portion of its length oblique to the vertical length of the cam plate but at its forward end it extends for a short distance in a direction straight across or perpendicular to the length of the cam plate as shown in Figure 15, thereby providing a rest 161 upon which the bearing sleeve 156 engages when the hereinafter described can driving wheel is in raised position.

The bearing sleeve 156 has extending therethrough the shaft 162 which carries upon the end adjacent to the inner side of the body plate, the can driving wheel 163 while upon its opposite or outer side it has mounted thereon the crank 164. The upper end of this crank is obliquely directed or angled as indicated at 165 as in the case of the cranks shown and described in connection with the preceding embodiments, which angled portion carries the thrust stud 166.

The rear vertical edge of the cam plate 159 has joined thereto and extending longitudinally thereof the thrust flange 167 which is positioned for engagement by the thrust stud 166. The upper end of the forward edge of the cam plate has a stop flange 168 connected therewith which functions to limit the forward swinging movement of the pawl 169 which is oscillatably supported upon the portion d of the pivot stud 150. This pawl hangs in the path of rotary movement of the stud 166 as shown.

In the operation of the third embodiment, if the lower end of the cam plate 159 is not in its extreme forward position the operating handle or crank 164 is turned counterclockwise to bring the thrust stud 166 against the lower end of the pawl 169. Engagement of the pawl against the flange 168 prevents its forward movement but causes the lower end of the cam plate to swing forwardly thereby riding the downwardly and rearwardly extending portion of the cam slot 160 over the bearing sleeve 156 and causing the bearing sleeve, shaft 162 and the forward end of the link 153 to lower, the bearing sleeve being lowered in the body plate slot 158. This body plate slot is struck from the center of the pivot 154 so that the movement of the bearing sleeve therein is accomplished smoothly and without binding.

Oscillation of the lower end of the cam plate 159 rearwardly effects the movement of the high end of the cam slot 160 under the bearing sleeve 156 and thus raises the driving wheel to operative position. When the bearing sleeve reaches the high and straight end of the cam slot it will come to rest on the seat 161 where it will be maintained while continued clockwise rotation of the crank is carried out for the cutting out of the head of the can.

Figure 18:
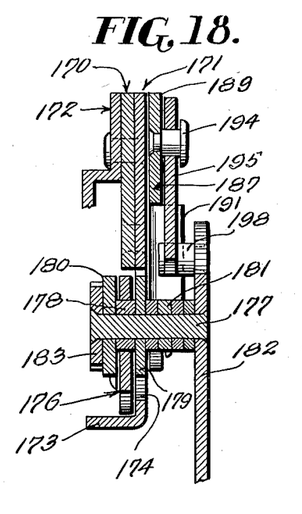
Figure 18 is a vertical section on line 18—18 of Figure 17.

Figures 17 and 18 illustrate a fourth embodiment of the invention wherein the supporting bracket arm is designated 170 and the body plate which is secured to the arm is designated 171.

To the upper part of the body plate upon the inner side is fixed the cutter carrying bracket 172, the lower portion of which is broken away. In a line directly below this bracket 172 the body plate is formed to provide the laterally extending can rest 173.

Between the can rest and the bracket 172 the body plate has formed therein the elliptical slot 174 which is struck from the center of a pivot stud or rivet 175 upon which is oscillatably mounted, upon the inner side of the plate and in the vertical plane of the arm 170, the fulcrum pivoted support bar 176.

The numeral 177 designates the crank and wheel supporting shaft which passes through the elliptical slot 174 and through the forward end portion of the support bar 176. This shaft carries the journal 178 which is snugly fitted in the opening of the support bar through which the shaft is extended and upon opposite sides of this journal are the spacer disks 179 and 180, the disk 179 being disposed within the elliptical slot 174.

Outwardly of the spacer disk 179 a number of spacers 181 are mounted upon the shaft which is of polygonal cross section whereby such disks together with the journal 178 are prevented from turning, and the spacers 181 position at a desired distance outwardly from or to the right of the body plate the hand crank 182 which is secured upon the end of the shaft 177 as best seen in Figure 18.

Upon the opposite or inner end of the shaft 177 is secured the can rim engaging driving wheel 183.

In the rearward end of the fulcrum pivoted support bar 176 there is mounted the rivet 184, the head of which is indicated by the numeral 185. This rivet 184 extends through a slot 186, of elliptical form and cut through the body plate, such slot being struck from the center of the pivot 175 upon which the arm 176 rocks.

The numeral 187 generally designates a bell crank shaped cam plate which has the depending rear portion 188 and the horizontal forwardly extending portion 189. This element is pivotally mounted upon the pivot rivet 190 which is secured in the upper part of the body plate and the bracket arm 170.

The forward vertical edge of the depending portion 188 carries the thrust flange 191 and rearwardly of this flange the plate is provided with the cam slot 192 which is directed upwardly and rearwardly or substantially obliquely to the supporting bracket arm 170. Within this slot is snugly positioned a roller 193 which is journaled on the stud 184. As shown the depending portion 188 of the cam plate engages between the underside of the head 185 and the body plate.

At the forward end of the portion 189 of the cam plate there is oscillatably mounted upon the rivet 194, the depending pawl 195 and the forward swinging movement of this pawl is limited by the stop flange 196 which extends vertically along the forward edge of the cam plate.

As in the other embodiments the upper end of the crank 182 is obliquely directed upwardly and rearwardly as indicated 197 and carries a thrust stud 198 for engagement with the flange 191.

In the operation of this fourth embodiment if the can driving wheel 183 is in the raised position as it is shown in Figures 17 and 18 it is first lowered by turning the crank counterclockwise to bring the stud 198 into engagement with the lower end of the pawl 195. This effects the oscillation of the cam bell crank 187, causing the depending leg portion 188 to swing downwardly and forwardly and thus riding the roller 193 upwardly and in the cam slot 192. This action also causes the stud 184 upon which the roller is mounted to swing up in the body plate slot 186 thereby oscillating the pivoted bar 176 to lower the forward end thereof and consequently the can driving wheel. The can is then mounted in position upon the driving wheel 183 and positioned against the rest 173 so as to be properly placed with respect to the cutter, not shown, whereupon turning the crank arm 182 in a clockwise direction the thrust stud 198 will be moved against the abutment flange 191 to cause reverse oscillation of the bell crank cam plate 187 thereby causing the downward swinging of the rear end of the pivoted bar 176 and the raising of the can driving wheel, together with the can engaged thereby, into proper position to be penetrated by the cutter.

The lower forward end of the cam slot 192 is angled forwardly slightly to receive the roller 193 when this operative position of the cam plate is reached thereby substantially locking the pivoted bar 176 in this working position and preventing accidental lowering of the pivoted bar and the can driving wheel through the application of downward thrust to the forward end of the pivoted bar. Thus the crank may be continuously turned clockwise to cut out the head of the can without danger of the supporting bar shifting or oscillating and releasing the can from the device.

Figure 19:
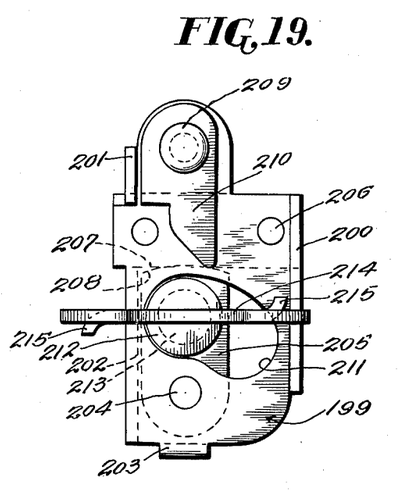
Figure 19 is a view in elevation of the outer side of a fifth embodiment of the invention.
Figures 20, 28, 29:
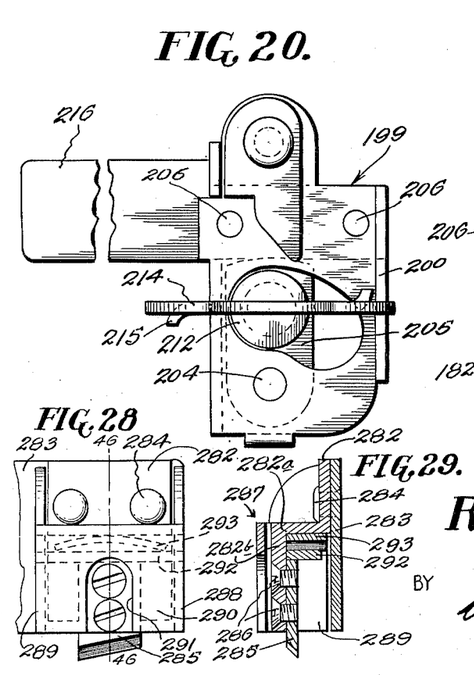
Figure 20 is a view in elevation of the outer side of the embodiment shown in Figure 19 showing a handle as a modified feature thereof.
Figure 28 is a left side view of a modified cutter support bracket and modified can rest for use therewith.
Figure 29 is a vertical section taken substantially on the line 29—29 of Figure 28.
Figure 21:
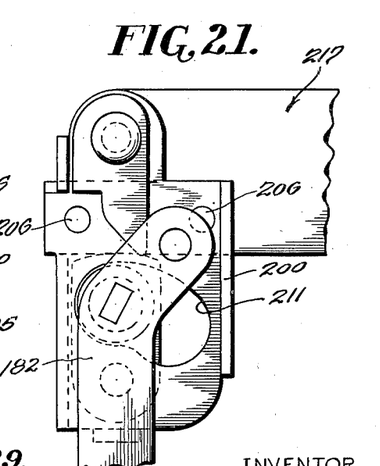
Figure 21 is a view in elevation of the outer side of the embodiment shown in Figure 19, showing such embodiment mounted upon a wall bracket and having a hand crank operating means.

Figures 19 to 21 inclusive illustrate the fifth embodiment of the present invention. The form of the fifth embodiment which is designed to be supported in the hand for use is shown in Figure 19 wherein the numeral 199 generally designates the body plate which, as in most of the preceding embodiments, is of rectangular design and is vertically positioned when in use.

The vertical rear edge of the body plate 199 has formed therealong the outwardly turned thrust flange 200 while the forward edge at the top portion thereof has the outwardly directed stop flange 201 and below this stop flange is formed integral with the forward edge of the body plate the inturned stop flange 202.

At the bottom of the body plate is the inturned or inwardly directed can rest 203 and directly above this can rest is mounted in the body plate the pivot rivet 204 upon which is oscillatably supported the short can wheel carrying or supporting link 205. Secured to the inner side of the body plate 199 by the rivets 206 is a cutter supporting head, not shown, but which may be in the form of any one of the previously described cutter supporting units. The lower or bottom edge of such cutter supporting head is designated by the broken or dotted line which is indentified by the reference character 207.

The link 205 is, as shown, of such length that when it is in vertical position the rounded end 208 thereof rides under the lower part of the cutter supporting head.

Above and in line with the pivot 204 is a pawl supporting pivot rivet 209 upon which is oscillatably suspended, upon the outer side of the body plate, the swinging pawl 210, the forward swinging movement of which is limited by the stop flange 201.

The numeral 211 designates an arcuate slot which is struck from the center of the pivot 204. In this slot is positioned for movement from a position directly in line with and between the pivots 204 and 209, to the rear downwardly directed end of the slot, a spacer disk 212 which is coupled with a journal 213 upon which is supported, upon the inner side of the body plate, the can rim engaging driving wheel, not shown.

Upon the outer side of the body plate is positioned the thumb and finger crank 214 which is coupled with the can driving wheel supporting journal 213 in the same manner as, for example, the thumb and finger crank shown in Figures 1 to 6. Since the construction here is the same as that shown and described in connection with the preceding figures referred to it is not thought necessary to show such details of construction in this embodiment.

The thumb and finger crank 214 has at diametrically opposite points, as in corresponding cranks hereinbefore described, the curved thrust fingers 215 which are adapted to be brought into contact with the forward face of the thrust flange 200 in the operation of setting up the opener upon a can and they also cooperate with the pawl 210 upon counter-clockwise rotation of the crank to release the device from a can.

In the operation of the embodiments shown in Figures 19 to 21, if, in starting to use the device, the driving wheel carrying link 205 is in its forward vertical position as shown in Figure 19, counter-clockwise rotation is imparted to the crank to bring one of the fingers 215 in contact with the pawl 210 thereby causing the link 205 to be swung rearwardly and downwardly so as to lower the can driving wheel, not shown.

The device is then mounted in position upon the can rim and clockwise rotation is given to the crank 214 whereupon one of the thrust fingers 215 will have the rounded side thereof brought into contact with the forward face of the thrust flange 200 and the link 205 will be forced forwardly on its pivot 204 thereby simultaneously moving the can driving wheel, not shown, forwardly and upwardly into proper working relation with the cutter or knife, not shown. Smoothness of action and stability are imparted to the structure by the good alignment effected by the spacer disks and when the center of the journal 213 is directly in line with and between the pivots 204 and 209 the parts will be firmly secured in working relation one with the other so that continued clockwise rotation may be given to the crank for cutting out the can head in a manner which will be readily apparent in the light of the description given with the preceding embodiments.

In Figure 20 the structure shown is the same as that in Figure 19 with the addition thereto of a handle 216 which is secured in place against the inner side of the body plate 199 by means of the rivets 206.

Figure 21 shows the same structure as in Figure 19 with the addition thereto of the bracket arm which is designated 217 and which, like the handle 216, is secured against the inner side of the body plate 199 by the rivets 206, and the substitution of a crank arm or handle for the thumb and finger handle. In these modifications it will be understood that the same change will be required in connection with the cutter support where such support is in the form of a frame such as that shown in Figure 8. In such case the width of the frame will be reduced as it is shown reduced in Figure 8 for the handle 31 so that the cutter and the can driving wheel will be properly positioned one with respect to the other.

Figures 22 and 23 illustrate a sixth embodiment of the invention wherein the supporting or bracket arm is generally designated 218, the forward end portion of which is enlarged to form the body plate which is generally designated 219.

The forward lower corner of the body plate 219 is cut out to form the recess 220 and rearwardly of this recessed portion the body plate has mounted therein the pivot rivet 221 upon which is oscillatably mounted the can driving wheel supporting fulcrum bar which is generally designated 222 and which is in the form of a bell crank. The fulcrum bar is upon the left hand or inner side of the body plate and comprises the lower horizontal portion 224 and the upwardly extending or upright portion 225. This fulcrum bar is bordered along its forward and under edge and along the back, top and forward edges by the inwardly turned or directed reenforcing flange 226.

The numeral 227 generally designates the oscillating cam plate which is disposed upon the outer side of the body plate and which is also substantially in the form of a bell crank, having the depending rear portion 228 and the forwardly extending portion 229 which is substantially horizontally disposed, like the arm 224 of the fulcrum bar, when the parts are in working position for the cutting out of the top or head of a can. In addition the cam plate 227 has the upwardly extending wing portion 230 in which is formed the cam slot 231. The major extent of this cam slot is inclined rearwardly and downwardly as shown and terminates at its lower end in the angled portion 231a which is directed substantially vertically or perpendicular to the bracket arm 218.

The numeral 232 designates a horizontally extending elliptical slot through which extends the pivot stud 233 which carries the roller 234. This pivot stud is supported in and extends through the upper end of the vertical portion 225 of the fulcrum bar and extends through to the outer side of the cam plate as shown in Figure 22 and the roller 234 has sliding engagement in the cam slot 231. Thus it will be seen that the forward end portion 24 of the bell crank shaped fulcrum bar 222 may oscillate downwardly on the pivot 221 whereby to move the pivot stud 233 in the slot 232.

The cam plate 227 is mounted in position upon the outer side of the body plate by the pivot rivet 235 which, it wil be seen, is of substantially the same form or design as the pivot rivet 150 shown in Figure 16. This rivet extends through the forward end of the forwardly extending portion 229 of the cam plate and in addition to oscillatably supporting the cam plate it supports upon the outer side of such plate the depending pawl 236 while at its inner end it is mounted in the body plate 219 as shown in Figure 23.

The forward edge of the portion 229 of the cam plate also carries the outwardly directed vertically extending stop flange 237 which limits the foward movement of the pawl 236. The forward edge of the depending portion 228 of the cam plate also carries the outwardly directed vertically extending abutment flange 238 for the purpose hereinafter described.

The numeral 239 designates the crank and driving wheel shaft which, as shown in Figure 23, passes through a journal 240 which is mounted for rotation in the forward portion 224 of the fulcrum plate.

The shaft 239 is of polygonal cross section and has mounted upon the inner and outer sides of the journal 240 the spacer disks 241 and 242 respectively. The disk 242 positions in the recess 220 and lies in the plane of the body plate as shown in Figure 23.

Upon the inner side of the spacer disk 241 the shaft has secured thereon the can rim engaging driving wheel 243 while upon the outer side of the disk 242 are suitable spacing washers 244 which maintain at the proper distance outwardly from the body plate, the crank arm 245 which is secured to the outer end of the shaft as in previously described embodiments. Also, as has been shown and described in previous embodiments, the upper end of the crank 245 is directed upwardly and rearwardly as indicated at 246 and carries the inwardly directed thrust stud 247 which is designed for operative engagement with the forward face of the abutment flange 238.

The inner end of the stud rivet 235 also secures in position against the inner side of the body plate, the cutter supporting or carrying bracket which is generally designated 248. As shown this bracket is of the same construction and is mounted in the same manner and also supports in the same manner the rotary cutter 249, as the bracket 92, which is shown and described in Figures 12, 13 and 14, therefore it is not believed that a detailed decription of the design and arrangement of the same is necessary.

Figure 12:
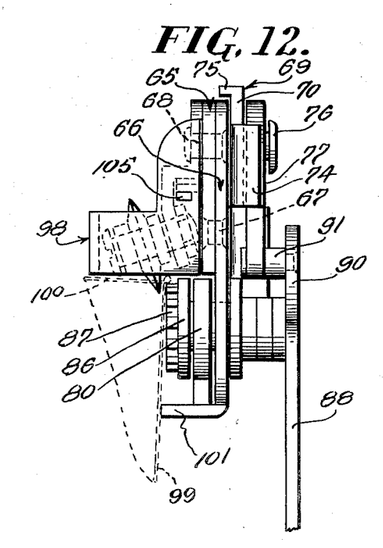
Figure 12 is a view in front elevation of the second embodiment shown in Figures 10 and 11.

There is also illustrated upon this embodiment a can rest frame which is generally designated 250 and which is of the same design and supported and placed in the same manner as the can rest 98 shown in Figures 12 and 14 and previously described. Accordingly it is believed that a detailed description of this unit in connection with this particular embodiment is not required for a proper understanding of the operation of the device.

In connection with the sixth embodiment when it is desired to put the same into use, if the can driving wheel 243 is not in its lowered position counterclockwise rotation of the crank 245 will bring the stud 247 against the pawl 236 thereby tending, through the engagement of the pawl 236 with the stop flange 237, to oscillate the rear end portion of the cam plate downwardly and forwardly. As this occurs the cam slot and roller 231 and 234 cooperate to force the upper end of the portion 225 of the fulcrum bar forwardly thereby causing the fulcrum bar to oscillate upon the pivot 221 for the lowering of the foward end of the portion 224 and the simultaneous lowering of the can driving wheel 243 from the cutter 249.

After placing the can in position upon the driving wheel in the obvious manner clockwise rotation is imparted to the crank 245. This brings the thrust stud 247 against the abutment flange 238 thereby swinging the cam plate rearwardly and upwardly on the pivot rivet 235 and causing reversal of the movement of the roller 234 in the cam slot 231. This swings the fulcrum bar back on the pivot 221 to its initial position thereby raising the can driving wheel 243 to effect the penetration of the cutter into the can head. The stud 247 may then move past the flange 238 and continued clockwise rotation may be given to the crank to cut out the can head.

In the seventh embodiment illustrated in Figure 24 a somewhat similar arrangement of parts is employed as in the sixth embodiment shown in Figures 22 and 23 except for the connection between the bell crank shaped fulcrum bar which is here generally designated 251 and the bell crank shaped rock member, generally designated 251' and corresponding to the cam plate 227.

The fulcrum bar 251 is of the same form as bar 222 and is pivotally supported by the rivet 252 which is mounted in the body plate 253 which forms an integral part of the supporting bracket arm, not shown, which corresponds to the arm 218.

The body plate has the elliptical slot 254 therein through which extends the stud 255 which is carried by the upper end portion 256 of the fulcrum bar.

The rock plate 251' is substantially in the form of a bell crank, having the forwardly extending portion 257 and the depending rear portion 258. These portions carry respectively the outwardly directed stop flange 259 and abutment flange 260 the functions of which are readily apparent.

The pivot stud 261 couples the forward end of the portion 257 with the body plate 253 and also supports the depending pawl 262 which has cooperative action with the thrust stud 263 which is carried upon the oblique upper end portion 264 of the can driving wheel operating crank 265. These parts and the mountings therefor are all the same as in the embodiment shown in Figure 23, therefore it is considered that a detailed description and illustration of the same is not required.

Adjacent to the rear of the portion 257 of the rock plate, such portion carries a pivot stud 266 which passes through an end of a toggle link 267, the opposite end of which link is traversed by the pivot stud 255. Thus the rock plate 251' is linked to the upper end portion 256 of the fulcrum bar 251 and it will be readily apparent that upon counterclockwise rotation of the crank 265 when the parts are in the position shown in Figure 24, the stud 263 will be brought into engagement with the pawl 262 which through engagement with the flange 259 will cause the member 251' to swing downwardly and forwardly on the pivot 261. In so swinging downwardly and forwardly, a forward and downward pull will be applied to the link 267 thus causing the bar 251 to oscillate on the pivot 252 to effect the lowering of the can driving wheel, not shown, with respect to the cutter, not shown. After placing the can in position upon the cutting device clockwise rotation of the crank 265 will reverse the action as will be readily apparent.

The numeral 267' designates a spacer which lies between the body plate 253 and the link 267. This spacer is in the same plane as the rock plate 251' and limits the counterclockwise oscillation of the rock plate 251' to approximately the illustrated position.

Figures 28 and 29 illustrate a modified cutter support bracket and modified can rest for use therewith.

The numeral 282 generally designates the modified cutter support bracket which includes the horizontal portion 282a and the vertical downwardly extending portion 282b. This modified bracket is secured to the wall extension arm 283 by the rivets 284. Thus the depending portion 282b is in spaced parallel relation with the inner-side of the supporting arm 283. The body plate of the opener device is not shown in association with this modified structure but it will be readily understood that a can driving wheel will be supported on such body plate with respect to the cutter 285, in the same relation as these elements are shown in preceding corresponding structures.

As shown a blade type cutter is mounted upon the depending portion of the bracket and is secured thereto by the screws 286, the upper end of the blade terminating short of the horizontal portion 282a of the bracket.

The can rest is generally designated 287 and comprises, like the can rests shown in Figures 11 to 14 and Figures 25 to 27, the front and rear sides 288 and 289 respectively and the inner connecting side 290, the central portion of which is recessed from the bottom edge as indicated at 291 to facilitate reaching the blade securing screws 286.

The vertical outer edges of the front and rear sides 288 and 289 position against the inner side of the arm 283 so that the can rest straddles the knife bracket and the knife as in the preceding forms and there is extended from front to rear between the front and rear sides of the can rest, the bar 292 which rests upon the top edge of the knife and which has interposed between it and the overlying horizontal portion 282a, the arcuate flat spring 293.

It will be readily seen that engagement of the bar 292 against the adjacent side of the bracket portion 282b maintains the can rest against outward movement while the spring 293 holds the bar 292 down against the top edge of the knife but may yield upon the application of upward pressure to the bottom edges of the can rest as when positioning and securing a can in place.

In view of the description of those preceding can rests of which the present can rest is a modification, it is not believed necessary to further describe the operation of the modified rest.

Figure 30:
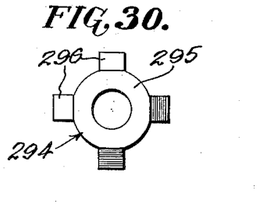
Figure 30 is a left side view of a resilient thrust washer or spring for use in connection with certain of the embodiments of the invention as hereinafter described.

Figure 30 illustrates in side elevation a resilient thrust washer or spring for use with the pivot rivet or pin of the fulcrum pivoted support bar or support bell crank of any embodiment using one of these. This washer is generally designated 294 and comprises an annular body portion 295 from the periphery of which extend the radial resilient prongs or fingers 296 which, as will be readily understood, are of arcuate form whereby the flattening of the thrust washer between two opposing flat surfaces tensions the spring fingers or prongs. This thrust washer or spring can be used either to exert desired pressure of the fulcrum pivoted support bar or support bell crank against the part to which it is pivoted to incur at all times some resistance to oscillation of the said support bar or support bell crank on its pivot; or, in addition, to permit the portion of the support bar or the support bell crank about the pivot to be forced against such predetermined tension, away from the part to which it is pivoted, a predetermined distance when necessary, such as when the seam of the wall portion of a can is passing between the can driving wheel and the cutter. When used for the latter purpose, the cutter support bracket would not have resilient properties. The resilient thrust washer or spring 294 could particularly be used for the latter purpose with the seventh embodiment, being placed on the pivot rivet 252. When so used, and the construction of the seventh embodiment is in the operating position, it will be seen that the can driving wheel supporting fulcrum bar 251 fulcrums laterally against a portion of the supporting arm 253, so that, when necessary, the can driving wheel can be forced away from the cutter a predetermined amount, against the predetermined resiliency of the resilient thrust washer or spring 294, such as when the seam of the wall portion of a can is passing between the can driving wheel and the cutter.

It is to be understood that the bearing 156, Figure 16, may be used with any of the other applicable embodiments illustrated and described in lieu of the bearing illustrated and described therewith.

It is also to be understood that any cutter mechanism and/or can rest in association therewith as illustrated and described in my prior patents or pending applications for patents may be used with any of the applicable embodiments illustrated and described in lieu of the construction shown and described therewith.

It is to be further understood that, although illustrated and referred to as vertical, the abutment flange of any embodiment may be cammed as desired to effect the preferred leverage at any point or points the cooperating fingers or studs are engaged therewith for the purpose described.

I claim:

1. A rotary drive wheel type can opener comprising a body plate member designed to be vertically disposed for use, a can head penetrating cutter supported upon one side of the plate member, a camming slot formed through the plate member oblique to the vertical length thereof, a bearing journal within the slot, a shaft extending through and secured to the journal, a can rim engaging driving wheel carried upon the end of the shaft adjacent to the cutter, a crank carried upon the opposite end of the shaft, a thrust element carried by the crank for movement in a circular path around the axis of rotation of the shaft, a shiftable pawl disposed in the path of movement of the thrust element and adapted to limit the counterclockwise rotation of the shaft to effect movement of the journal in the cam slot in a direction to separate the wheel from the cutter, and a thrust member adapted to be engaged by the thrust element upon clockwise rotation of the shaft, to effect shifting of the journal in the slot in a direction to move the wheel towards and into operative relation with the cutter.

2. A rotary drive wheel type can opener of the character stated in claim 1 in which the cam slot has a portion of one end directed transversely to the said vertical length of the plate to provide a seat for said journal when the driving wheel has been moved into working position relative to the cutter.

3. A rotary drive wheel type can opener comprising a body plate designed to be vertically disposed for use, a rotatable can rim engaging driving wheel and a cutter supported from the body plate upon one side thereof, the cutter and wheel having relative movement, a crank operatively coupled with the wheel for imparting rotary motion thereto, the crank being upon the opposite side of the body plate from the wheel and comprising a relatively long portion having a hand gripping means upon the free end thereof and an obliquely extending opposite end portion upon the opposite side of the connection with the wheel from the hand grasping means, a thrust pin carried by the obliquely extending portion of the crank and directed inwardly toward the body plate, a thrust receiving flange supported from the body plate and adapted to be engaged by said pin upon rotation of the crank to effect a desired relative movement between the cutter and the driving wheel, and a pivoted pawl member supported from the body plate in the line of circular movement of said pin to be engaged by the pin upon a reverse rotation of the crank to effect opposite relative movement between the cutter and the wheel.

4. A rotary drive wheel type can opener comprising a body plate having therein an elliptical slot which is vertically disposed in the working position of the opener, a can top cutter supported on one side of the plate in spaced relation with an end of said slot, a cam plate pivotally connected with the body plate upon the opposite side from the cutter and overlying said slot, an arcuate cam slot in the cam plate and directed across the body plate slot, a link upon the opposite side of the body plate from the cam plate and extending in the direction of the length of the cam slot, a pivot between an end of the link and the body plate at a point remote from the body plate slot, a bearing sleeve having an end fixed in the other end of the link and extending through said slots, the sleeve having camming engagement with an edge of the cam slot, a shaft extending through said sleeve, a cam rim flange engaging and driving wheel on the end of the shaft adjacent to the center, a crank upon the other end of the shaft, and coacting means between the crank and cam plate for effecting a predetermined thrust movement to the cam plate upon clockwise or counterclockwise turning of the crank.

5. A can opener of the character stated in claim 4, wherein said arcuate cam slot breaks downwardly slightly from a relatively true arc at its forward end to form a seat for the bearing sleeve when the sleeve is in raised position in the first slot.

6. A rotary drive wheel type can opener comprising a body member, a can rim engaging driving wheel, means by which the wheel is rotatably supported by the body, a cutter, means by which the cutter is supported by the body, the cutter and wheel supporting means being so constructed and arranged that one may be moved relative to the other, a crank having driving connection with said wheel, a thrust element connected with the crank to be moved therewith in a circular path around the rotary axis of the wheel, a thrust receiving part supported independently of the cutter and wheel at one side of the axis of said wheel and formed to provide a single long strike face in the rotary path of said thrust element said thrust receiving part moving lengthwise of said body in a generally horizontal line by and upon engagement of the thrust element with the thrust receiving part upon movement of the thrust element in one direction in its rotary path, means forming an operative coupling between the thrust receiving part and the wheel by which said wheel is moved toward the cutter in a line substantially perpendicular to said horizontal line upon movement of the thrust receiving part by the thrust element, and means operated by said thrust element for moving the wheel away from the cutter upon movement of the thrust element in reverse direction in its rotary path.

7. A rotary drive wheel type can opener comprising a body member, a can rim engaging driving wheel, means by which the wheel is rotatably supported by the body, a cutter, means by which the cutter is supported by the body, the cutter and wheel supporting means being so constructed and arranged that one may be moved relative to the other, a crank having driving connection with said wheel, a thrust element connected with the crank to be moved therewith in a circular path around the rotary axis of the wheel, a thrust receiving part supported independently of the cutter and wheel at one side of the axis of said wheel in the rotary path of said thrust element to be engaged by such element in its movement in said path, the thrust receiving part and said wheel being movable relative to one another in a generally horizontal line by and upon engagement of the thrust element with the thrust receiving part upon movement of the thrust element in one direction in its rotary path, means forming an operative coupling between the thrust receiving part and the wheel by which said wheel is moved toward the cutter in a line substantially perpendicular to said horizontal line upon movement of the thrust receiving part by the thrust element, and means operated by said thrust element for moving the wheel away from the cutter upon movement of the thrust element in reverse direction in its rotary path, the said thrust receiving part comprising a vertical flange extending in a direction perpendicular to the side of the body member and having a bearing face against which said thrust element has wiping contact.

8. A can opener of the character stated in claim 6, in which said last means comprises a stop pivotally supported adjacent to and independently of the thrust receiving part and in the said circular path of the thrust element, said stop being constructed and arranged to permit the uninterrupted movement of the thrust element in one direction in said path and to check the return movement of the thrust element whereby to effect movement of the wheel and cutter out of working position.

9. A rotary drive wheel type can opener comprising a body member, a can rim engaging driving wheel, means by which the wheel is rotatably supported by the body, a cutter, means by which the cutter is supported by the body, the cutter and wheel supporting means being so constructed and arranged that one may be moved relative to the other, a crank having driving connection with said wheel, a thrust element connected with the crank to be moved therewith in a circular path around the rotary axis of the wheel, a thrust receiving part supported independently of the cutter and wheel at one side of the axis of said wheel in the rotary path of said thrust element to be engaged by such element in its movement in said path, the thrust receiving part and said wheel being movable relative to one another in a generally horizontal line by and upon engagement of the thrust element with the thrust receiving part upon movement of the thrust element in one direction in its rotary path, means forming an operative coupling between the thrust receiving part and the wheel by which said wheel is moved toward the cutter in a line substantially perpendicular to said horizontal line upon movement of the thrust receiving part by the thrust element, means operated by said thrust element for moving the wheel away from the cutter upon movement of the thrust element in reverse direction in its rotary path, the said last means comprising a pivoted pawl supported to have an end disposed in the circular path of movement of the thrust element, said pawl having an extent of free swinging movement sufficient to permit passage of the thrust element in one direction in the said circular path, and means limiting the reverse swinging movement of the pawl to a position where the thrust element is engaged and held against reverse movement in said circular path beyond a predetermined extent to effect relative movement of the wheel and cutter out of the said working relation.

10. A rotary drive wheel type can opener, comprising a flat body plate designed to be vertically disposed for use, a cutter and a can rim engaging driving wheel supported from the plate for relative movement, a crank operatively coupled with the driving wheel for imparting rotary movement thereto, a thrust element carried by said crank for movement in a circular path around the axis of rotation of the wheel, and a long thrust receiving member supported from the body plate and independent from the cutter and driving wheel, the thrust receiving member and thrust element being separate one from the other and relatively movable toward and away from each other, the thrust receiving member having a strike face disposed in the path of rotation of the thrust element to be engaged by the thrust element and having the thrust element move lengthwise therealong upon rotation of the crank, the thrust element moving between the said strike face and the rotational axis of the wheel in the said rotation of the crank, means supporting the thrust element and thrust receiving member for relative movement independently of the movement of the element in the circular path whereby the engagement of the thrust element against the thrust receiving member acts to force the thrust receiving member away from the wheel, and means coupling the thrust receiving member with the wheel for relatively moving the cutter and wheel into working relation upon the stated movement of the thrust receiving member away from the wheel.

11. A rotary drive wheel type can opener, comprising a flat body plate designed to be vertically disposed for use, a cutter and a can rim engaging driving wheel supported from the plate for relative movement, a crank operatively coupled with the driving wheel for imparting rotary movement thereto, a thrust element carried by said crank for movement in a circular path around the axis of rotation of the wheel, and a long thrust receiving member supported from the body plate and independent from the cutter and driving wheel, the thrust receiving member and thrust element being separate one from the other and relatively movable toward and away from each other, the thrust receiving member being disposed in the path of rotation of the thrust element and adapted to be engaged by the thrust element upon rotation of the crank, means supporting the thrust element and thrust receiving member for relative movement independently of the movement of the element in the circular path whereby the engagement of the thrust element against the thrust receiving member acts to force the thrust receiving member away from the wheel, and means coupling the thrust receiving member with the wheel for relatively moving the cutter and wheel into working relation upon the stated movement of the thrust receiving member away from the wheel, the said thrust element comprising a finger member projecting from the crank and the thrust receiving member comprising a relatively long flange normally vertically disposed and extending laterally from and in perpendicular relation with the body plate.

12. The invention according to claim 3, wherein the support for the thrust receiving flange comprises an oscillatable member pivoted to the body plate, the said flange projecting laterally from such member, a rocking element pivotally attached to the body plate and having an end connected with said shaft for shifting the shaft lengthwise of the body plate, and a link coupling between the opposite end of the rocking element and the oscillatable member.

13. The invention according to claim 12, wherein said oscillatable member includes an arm portion extending transversely of the body plate and a pawl pivotally attached to said arm and depending in said rotary path and adapted upon counterclockwise rotation of the crank for engagement by the thrust element to effect oscillation of the oscillatable member in one direction to move the driving wheel away from the cutter.

14. The invention according to claim 12, wherein said oscillatable member is in the form of a bell crank having a horizontal arm and a vertical depending arm projecting below the pivot for the oscillatable member, said thrust member constituting a laterally extending flange forming an integral part of the depending arm and extending lengthwise thereof, and the said link coupling between the oscillatable member and the rocking member being connected with the said depending arm at a point in a plane between the pivot center for the oscillatable member and the pivot between the link and the rocking element whereby said pivot center and pivot connection may be brought into alignment upon actuation of the rocking member in a direction to move the wheel toward the cutter.

15. The invention according to claim 3, wherein the body plate has a vertical slot therein below the cutter, said support comprising a bell crank element upon the side of the body plate opposite from the cutter and pivoted on the plate for oscillation, said element having a horizontal arm and a vertical depending arm, said depending arm having a cam slot extending oblique to the vertical, a fulcrum bar disposed upon the same side of the plate as said cutter and pivotally coupled between its ends to the body plate, an end of said bar being disposed across said slot, the other end of the bar and the slotted portion of said depending arm being in overlapping relation, the body plate between the overlapping bar and arm end having a guide slot extending in a direction transverse to and across said cam slot, a camming pin secured to the said other end of the bar and extending through the crossed guide and cam slot, said coupling between the crank and wheel comprising a shaft extending through said vertical slot and through an opening in the said end of the bar, said driving wheel being secured to the end of the shaft adjacent to the cutter, spacing washers carried by the shaft between the crank and wheel, and said thrust receiving flange and said pivoted pawl member being carried respectively by the depending and horizontal arms of the bell crank element.

16. The invention according to claim 15, wherein one of said spacing washers lies within the vertical slot for rotational and longitudinal movement therein, a second spacing washer lies in the said opening or bearing in the bar and forms a journal therein for the polygonal shaft, and a third spacing washer lies on the same side of the bar as the driving wheel and is between the second spacing washer and the driving wheel, the first and third spacing washers maintaining the shaft in perpendicular alignment to the bar in all directions.

ROBERT E. McLEAN.

REFERENCES CITED

The following references are of record in the file of this patent:

UNITED STATES PATENTS

| Number | Name | Date |
|---|---|---|
| 1,426,182 | Gross | Aug. 15, 1922 |
| 1,489,615 | Steiner | Apr. 8, 1924 |
| 2,314,506 | McLean | Mar. 23, 1943 |